United States Patent [19]

Ahad

[11] Patent Number: 5,130,381
[45] Date of Patent: Jul. 14, 1992

[54] BRANCHED ENERGETIC POLYETHER ELASTOMERS

[75] Inventor: Elie Ahad, Ste-Foy, Canada

[73] Assignee: Her Majesty the Queen in right of Canada, as represented by the Minister of National Defence of Her Majesty's Canadian Government, Ontario, Canada

[21] Appl. No.: 680,927

[22] Filed: Apr. 5, 1991

[51] Int. Cl.$^5$ .................. C08G 65/24; C08G 65/32
[52] U.S. Cl. .................. 525/407; 525/403; 528/405
[58] Field of Search .............. 525/403, 407; 528/405

[56] References Cited

U.S. PATENT DOCUMENTS

| | | | |
|---|---|---|---|
| 3,310,504 | 3/1967 | Vandenberg | 525/403 |
| 4,486,351 | 12/1984 | Earl | 525/403 |
| 4,882,395 | 11/1989 | Ajad et al. | 525/407 |

Primary Examiner—John Kight, III
Assistant Examiner—Shelley Wright
Attorney, Agent, or Firm—Nixon & Vanderhye

[57] ABSTRACT

The invention disclosed relates to novel branched chain hydroxy-terminated aliphatic azido polymers and copolymers with variable molecular weight (MW) and a single step method for the preparation thereof which involves respectively reacting a high (MW) $0.5-5.0 \times 10^6$) solid rubbery polyepichlorohydrin (PECH) homopolymer and epichlorohydrin/alkylene oxide copolymer (PEEC), with an alkali metal azide in a suitable organic solvent, in the presence of an initiator at elevated temperature. The MW of the azido product may be controlled by including the reaction mixture a basic degradation catalyst (such as $LiOCH_3$ or NaOH) and varying the amount of catalyst. When the reaction is catalyzed, the MW of the product varies within the range 1,000–40,000 and the hydroxyl functionality is 2–10. Uncatalyzed reactions yield products with MW between 40,000 and 200,000 and a functionality of about 10. The branched azido polymers and copolymers yield energetic binders with improved mechanical properties and thermal stability which are useful in rocket propellants and composite explosives formulations.

37 Claims, No Drawings

BRANCHED ENERGETIC POLYETHER ELASTOMERS

BACKGROUND OF THE INVENTION

This invention relates to a novel process for making branched chain hydroxy-terminated aliphatic azido ether polymers and copolymers.

The branched chain hydroxy-terminated aliphatic azido ether polymers and copolymers are useful as binders in energetic formulations such as rocket and gun propellants, composite explosives and pyrotechnics to enhance the performance and stability and generally improve the physico-chemical properties. Such polyethers include glycidyl azide polymer (GAP) and copolymers based on GAP.

DESCRIPTION ON THE PRIOR ART

Linear hydroxy-terminated aliphatic polyethers having alkyl azide substituents, e.g. GAP, and a process for making same are described in U.S. Pat. No. 4,268,450 of May 19, 1981, in the name of M. B. Frankel et al. According to the Frankel et al process, in a first reaction step, the starting material, epichlorohydrin (ECH) is polymerized to polyepichlorohydrin (PECH) using a catalyst, boron trifluoride ($BF_3$) in the presence of a dichloro compound such as carbon dichloride. In a second step, PECH is azidized using a molar excess of the order of 2:1 sodium azide ($NaN_3$) in the presence of a polar organic solvent dimethyl formamide (DMF) for three days at 100° C. It is emphasized that a molar excess, of about 2:1, of sodium azide is typically employed. Since sodium azide is of a poisonous nature, the use of large amounts is a distinct disadvantage. A final purification step using methylene chloride and drying over magnesium sulfate is also described. This multi step process is costly and takes from four to seven days to complete.

It is emphasized that Frankel et al's product is a linear polymer. This is apparent from the functionality of the polymer as determined from the defined structural formula, i.e. including two OH groups, one at each end, and confirmed by the single example wherein the functionality is given as two. In fact, according to Frankel's process only linear polymers may be obtained.

The multi step process can be avoided by purchasing the PECH commercially and azidizing as per the second step, as is done by R. A. Earl in U.S. Pat. No. 4,486,351 of Dec. 4, 1984. However, the polyethers obtained according to Earl's process have essentially the same molecular weight as the starting reactant PECH (i.e. the chemical reaction which occurs is a simple replacement of Cl by $N_3$ in the polymer structure). Moreover, the choice of commercially available PECH with specific molecular weight is limited and costs are relatively high.

In another prior art process of E. J. Vandenberg et al disclosed in U.S. Pat. No. 3,310,504 issued Mar. 21, 1967, high molecular weight epichlorohydrin polymers and copolymers have been found to undergo a cleavage reaction to form lower molecular weight polymers when reacted with an organometallic compound of an alkali metal in the presence of dimethylsulfoxide (solvent) at 65° C. The resulting linear polymers (functionality equal to or less than 2) include both hydroxyl and carbonyl terminal groups. The carbonyl groups are reduced to hydroxyl by further reaction with lithium aluminum hydride. It is emphasized that the Vandenberg et al method involves two distinct reactions and azidation is not involved. Accordingly, a third reaction (azidation) is required to obtain GAP polymers and copolymers. Besides, the method of Vandenberg et al does not involve any MW control for the product.

In applicant's U.S. Pat. No. 4,882,395 of Nov. 21, 1989 and in applicant's U.S. application Ser. No. 415,723 filed Oct. 2, 1989, branched chain hydroxy-terminated aliphatic azido ether polymers and copolymers, and processes for making same are described. The processes involve the reaction of a solid rubbery high-molecular weight epichlorohydrin polymer (PECH) or copolymer with an alkylene oxide (PEEC) with an epoxide monomer such as epichlorohydrin (ECH) and an alkali metal azide (e.g. sodium azide) in a suitable organic solvent (e.g. dimethyl formamide) at elevated temperature. The reaction involved is a single step combined degradation and azidation which results in an almost entirely hydroxyl terminated branched polymer of relatively low molecular weight.

Accordingly, it is an object of the invention to provide a novel single step process for the preparation of low molecular weight branched chain hydroxy-terminated aliphatic azido polymers and copolymers involving both the degradation and azidation of high molecular weight solid rubber material such as PECH or PEEC, with an alkali metal azide at elevated temperature, i.e. without the addition of an epoxide monomer such as ECH.

It is a further object of the invention to control the molecular weight of the low molecular weight product by including in the reaction mixture a basic degradation catalyst and varying the amount of catalyst.

It is another object of the invention to provide branched chain hydroxy-terminated aliphatic azido polymer and copolymer binders with improved mechanical properties and thermal stability for use in energetic formulations.

SUMMARY OF THE INVENTION

According to the invention, a process for the preparation of branched chain hydroxy-terminated aliphatic azido ether polymers and copolymers of structural Formulas I and II,

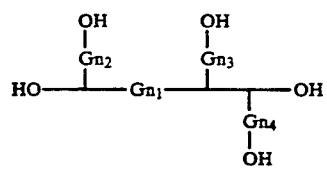

wherein
G = GAP unit

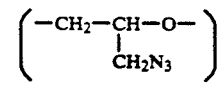

n = total number of GAP units;
$n = n_1 + n_2 + n_3 + n_4 + \ldots + n_s =$ $$\sum_{i=1}^{s} n_i$$

$n_1$ = number of GAP units in segment 1;
$n_2$ = number of GAP units in segment 2;
$n_s$ = number of GAP units in segment s;
s = total number of segments in the molecule;
For uncatalyzed reactions
$400 \leq n \leq 2000$, of a functionality of about 10 and a molecular weight of 40,000 to 200,000;
For catalyzed reactions
$10 \leq n \leq 400$, of a functionality of 2 to 10 and a molecular weight of 1,000 to 40,000; and

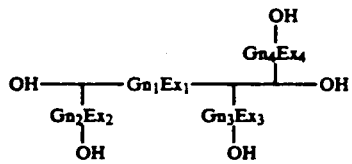

wherein
E is a (—O—R) unit, where R is C1 to C4 lower-alkyl;
n = total number of GAP units in the copolymer;
x = total number of E units in the copolymer;
$n_1$ and $x_1$ are respectively the number of GAP and E units in segment 1;
$n_2$ and $x_2$ are respectively the number of GAP and E units in segment 2;
$n_s$ and $x_s$ are respectively the number of GAP and E units in segment s;
s = total number of segments in the copolymer;
$n = n_1 + n_2 + \ldots + n_s =$ $$\sum_{i=1}^{s} n_i$$

$x = x_1 + x_2 + \ldots + x_s =$ $$\sum_{i=1}^{s} x_i$$

For uncatalyzed reactions
$280 \leq x \leq 1400$,
$280 \leq n \leq 1400$, a functionality of about 10 and a molecular weight of 40,000 to 200,000;
For catalyzed reactions
$7 \leq x \leq 280$,
$7 \leq n \leq 280$, a functionality of 2 to 10 and a molecular weight of 1,000 to 40,000, is provided comprising the single step of respectively reacting a solid rubbery epichlorohydrin polymer (PECH) and epichlorohydrin-alkylene oxide (PEEC) copolymer, of a molecular weight of 0.5 to $5.0 \times 10^6$, with an alkali metal azide selected from the group consisting of sodium azide, potassium azide and lithium azide, in a suitable organic solvent, in the presence of a suitable initiator at a temperature of 70° to 100° C., while agitating for 16-32 h. The use of a basic degradation catalyst is optional.

The reaction mechanism is believed to involve the simultaneous degradation and azidation of the high MW rubbery PECH or PEEC by alkali metal azide and elevated temperature (70° to 100° C.). The degradation occurs at the oxygen bonds and yields long chains of GAP polymers or copolymers, respectively. The long chains of GAP polymers or copolymers thus formed are then grafted to the degraded rubbery matrix via chain transfer and give rise to termination and branching reactions. Termination reactions occur when the grafting takes place at the oxygen bonds. Branching occurs when the grafting takes place at the alkyl groups involved in the nucleophilic substitution. The final product thus obtained has a branched structure with terminal OH groups.

More specifically, if no catalyst is used in the reaction, the degradation is then only partially accomplished mainly by alkali metal azide (because of its alkalinity) and the final product thus obtained is an extremely viscous or rubbery azide polymer or copolymer with relatively high MW. When the reaction is uncatalysed, the degradation of the rubbery starting material (MW $0.5-5.0 \times 10^6$) for 16-32 h at 70° to 100° C. will yield azido products with MW of 40,000-200,000 and a hydroxyl functionality of about 10. Further for GAP products of formula I, $400 \leq n \leq 2000$ and for azido copolymers of formula II, $280 \leq n \leq 1400$ and $280 \leq x \leq 1400$.

The degradation catalyst is mainly used to control and further reduce the MW of the azido product. The MW can be adjusted to the desired value by varying the catalyst concentration in the reaction mixture. The catalyst increases the degradation rate. Specifically, for catalyzed reactions, the MW of the azido product (GAP or GAP copolymer) is lowered by increasing the weight ratio (catalyst/rubber) while maintaining the weight ratio ($NaN_3$/rubber) constant. Preferably, the weight ratio ($NaN_3$/rubber) is between 0.55 and 0.80 (i.e. for a given rubber, solvent and reaction temperature). For GAP products, the ratio ($NaN_3$/PECH) is preferably about 0.80 and for GAP copolymer products, the ratio ($NaN_3$/PEEC) is preferably about 0.55; these ratios are approximately 14% above the stochiometric amounts. Less $NaN_3$ is required in the case of GAP copolymers because they contain about 70% GAP. More specifically by employing a weight ratio of catalyst/rubber of 0.025 to 0.25 in the reaction, the MW of the product varies within the range 1,000-40,000, the hydroxyl functionality is 2-10. Further, for GAP polymer products of formula I, $10 \leq n \leq 400$ and for GAP copolymer products of formula II, $7 \leq x \leq 280$ and $7 \leq n \leq 280$.

The basic degradation catalyst employed is an organometallic compound of an alkali metal. Any organometallic compound of an alkali metal, i.e. lithium, sodium, potassium, rubidium or cesium, can be used. The organo moiety will preferably be a hydrocarbon groups as, for example, an alkyl, aryl, alkenyl, alkynyl, cycloalkyl, cycloalkenyl, or aralkyl, etc., group. Exemplary of the alkali metal organometallic compounds that can be used are methyllithium, ethyllithium, isopropyllithium, n-butyllithium, isobutyllithium, tert-butyllithium, amyllithium, decyllithium, octadecyllithium, cyclohexyllithium, cyclohexenyllithium, phenyllithium, naphthyllithium, vinyllithium, lithium acetylide, methylsodium, ethylsodium, propylsodium, isopropylsodium, the butyl sodiums, amylsodium, dodecylsodium, benzylsodium, isopropenylsodium, allylsodium, octadecenylsodium, butadienylsodium, isoprenylsodium, butylrubidium, butylcesium, methyl-, ethyl-, propyl- and butyl-potassium, allylpotassium, octylpotassium, phenylpotassium, cyclopentrylpotassium, cyclohexenylpotassium, etc. Other types of cleaving compounds, such as alkali metal alkoxides and phenoxides, for example, sodium or lithium methoxide, ethoxide, isopropoxide, or n- or t-butoxide, or sodium or lithium phenoxide and even alkali metal hydroxides such as sodium hydroxide can also be used to produce the cleaved polymers of this invention.

Of these, lithium methoxide (LiOCH$_3$), sodium methoxide (NaOCH$_3$), sodium ethoxide (NaOC$_2$H$_5$), potassium tert-butoxide (CH$_3$)$_3$COK, sodium hydroxide (NaOH) and potassium hydroxide (KOH) are preferred.

The molecular weight of the GAP polymer or copolymer product may also be controlled by varying certain reaction parameters, i.e. temperature, time and solvent concentration and by the proper selection of the MW for the starting rubber (the lower the MW of the reactants, the lower will be the MW of the azido products).

The preferred alkali-metal azide is sodium azide and the alkylene oxide is typically ethylene oxide.

The solvents employed in our process must dissolve the rubbery PECH or PEEC and also sodium azide in order to accomplish both the degradation and azidation reactions. Preferably, the PECH or PEEC is first dissolved in the solvent. It will be appreciated that the dissolution time is dependent on the MW of the starting rubbery material. High MW rubbers will generally require longer dissolution time than PECH or PEEC samples with lower MW. Suitable organic solvents include polar organic solvents such as dimethyl formamide (DMF), dimethyl acetamide (DMA), and dimethyl sulfoxide (DMSO).

A small amount of ethylene glycol (EG) is conveniently used as an initiator. Glycerol and water could also be used as initiators indicated of EG.

Preferably, the azide is added to the mixture before the catalyst in order to prevent gelling of the mixture.

The reaction temperature is typically in the range of 70°-100° C., with a temperature of about 100° C. being preferred.

For uncatalyzed and catalyzed reactions at a fixed reaction temperature, as the reaction time increases, the molecular weight of the GAP or GAP copolymer product decreases. The MW of the azido product can also be reduced by increasing the solvent concentration.

With catalyst present, the molecular weight of the GAP and GAP copolymer products may be controlled by varying the weight ratio of catalyst to reactant rubber while keeping the reaction time and temperature constant. Accordingly, as the weight ratio of catalyst:rubber (i.e. the amount of catalyst relative to rubber) increases, the molecular weight of the GAP or GEC product decreases.

Preferably, upon cooling the solid salts are filtered and most of the solvent is evaporated at 50° C. under vacuo. A suitable organic solvent such as methylene chloride is then added to the reaction mixture followed by two water washes to remove the solvent e.g. DMA, the initiator e.g. EG, unreacted alkali metal azide and the by-product alkali metal chloride. Three additional extractions are furthermore accomplished using brine solution.

Preferably, the washing step is followed by a purification step which involves drying the methylene chloride solution over magnesium sulfate, and passing the solution through a column containing silica gel and activated charcoal. The solvent is then driven off by heating.

EXAMPLE 1

Preparation of Elastomeric GAP 10 g of a commercial rubbery PECH sample (MW ~7×10$^5$) is dissolved in 50 g of DMA for approximately 1 h at 100° C. with agitation. EG (5 g) and NaN$_3$ (8 g) are then added to the mixture. After approximately 1 h, LiOCH$_3$ (1.5 g) is then added to the reaction mixture and the reaction is carried out with agitation at 100° C. for about 16 h. The weight ratio (NaN$_3$:PECH) is maintained at about 0.80 in the reaction mixture. Heating and agitation are stopped and the reaction mixture is allowed to cool. The solid salts (NaCl and unreacted NaN$_3$) are then filtered out and most of the DMA is evaporated at 50° C. under vacuum. MeCl$_2$ (50 ml) is then added to the reaction followed by two 100 ml water extractions to remove the remaining DMA, EG and salts. Three additional extractions are furthermore accomplished using 100 ml of brine (10% NaCl/H$_2$O). The MeCl$_2$ solution is dried over magnesium sulfate and then passed through a column containing 3 g of silica gel and 3 g of activated charcoal. The resulting solution is heated to 50° C. under vacuum to remove the solvents (MeCl$_2$ and DMA) and yield 9.0 g (90%) of elastomeric GAP with a light yellow colour. The molecular weight of the GAP product is about 600. The Tg is about −55° C. and the functionality (f) is about 2.5. Elemental analysis of the polymer as well as NMR spectroscopy confirmed that quantitative conversion of PECH to GAP was achieved.

EXAMPLE 2

Preparation of Elastomeric Glycidyl Azide - Ethylene Oxide Copolymer (GEC)

Elastomeric GEC is prepared according to the same previous procedure as in Example 1, except that commercial rubbery Epichlorohydrin-Ethylene Oxide Copolymer (PEEC) is used instead of PECH as the starting material. The copolymer contains about 70% PECH and 30% Ethylene Oxide. For this reason, a weight ratio NaN$_3$:PEEC of 0.55 is used in this case. Specifically, the reaction for 16 h at 100° C. of 10 g PEEC (MW~9×10$^5$) in 50 g DMA and 5 g EG with 5.5 g NaN$_3$ and 1.5 g NaOH will yield 9.0 g (90%) of GEC azido product. This copolymer containing about 70% GAP and 30% Ethylene Oxide has a MW of about 10,000, a Tg of about −55° C. and a functionality (f) of about 3.5.

EXAMPLE 3

Preparation of Elastomeric GAP (without catalyst)

10 g of a commercial rubbery PECH sample (MW~7×10$^5$) is dissolved in 50 g of DMA for approximately 1 h at 100° C. with agitation. EG (5 g) and NaN$_3$ (8 g) are then added to the reaction mixture and the reaction is carried out with agitation at 100° C. for about 16 h. The weight ratio (NaN$_3$:PECH) is maintained at about 0.80 in the reaction mixture. Heating and agitation are stopped and the reaction mixture is allowed to cool. The solid salts (NaCl and unreacted NaN$_3$) are then filtered out and most of the DMA is evaporated at 50° C. under vacuum. MeCl$_2$ (50 ml) is then added to the reaction followed by two 100 ml water extractions to remove the remaining DMA, EG and salts. Three additional extractions are furthermore accomplished using 100 ml of brine (10% NaCl/H$_2$O). The MeCl$_2$ solution is dried over magnesium sulfate and then passed through a column containing 3 g of silica gel and 3 g of activated charcoal. The resulting solution is heated to 50° C. under vacuum to remove the solvents (MeCl$_2$ and DMA) and yield 9.0 g (90%) of elastomeric GAP with a light yellow colour. The molecular weight of the GAP product is about 80,000. The Tg is about −50° C. and the functionality (f) is about 10. Elemental analysis of the polymer as well as NMR spectroscopy confirmed that quantitative conversion of PECH to GAP was achieved.

Table 1 details the properties of various azido ether polymers and co-polymers made according to the invention without catalyst.

tion, one actually observes functionality less than 2 for the linear GAP samples prepared according to Frankel's process. As shown in Tables 1 and 2, GAP and GEC obtained from the degradation process have a functionality of about 10 when no catalyst is used and from 2 to 10 when catalyst is included.

Moreover, a low glass transition temperature (Tg) is usually an indication of superior physio-chemical properties for the binder and as Tg decreases when the MW

TABLE 1

Properties of some Azido Elastomers prepared at 100° C. (without catalyst)

| Starting Material Reactant rubber | MW × $10^6$ | Reaction Solvent | Time (hrs) | Azido Product Type | Tg (°C.) | MW |
|---|---|---|---|---|---|---|
| PECH | 2.8 | DMF | 16 | GAP | −45 | 130,000 |
|  | 2.8 | DMA | 16 |  | −45 | 160,000 |
|  | 2.8 | DMA | 32 |  | −45 | 130,000 |
| Polymer | 2.0 | DMF | 16 | Polymer | −48 | 100,000 |
|  | 2.0 | DMF | 32 |  | −50 | 60,000 |
| $-[CH-CH_2-O]_x$ <br> $\quad\ \ \ \vert$ <br> $\quad\ \ CH_2Cl$ | 1.3 | DMF | 16 | $-[CH-CH_2-O]_x$ <br> $\quad\ \ \ \vert$ <br> $\quad\ \ CH_2N_3$ | −50 | 80,000 |
| PEEC Copolymer | 0.7 | DMF | 16 | GEC Copolymer (70% GAP − 30% EO) | −50 | 53,000 |
|  | 0.7 | DMA | 16 |  | −50 | 80,000 |
|  | 0.9 | DMF | 16 |  | −50 | 180,000 |
| $-[CH-CH_2-O-(CH_2)_2-O]_x$ <br> $\quad\ \ \vert$ <br> $\quad\ CH_2Cl$ | 0.9 | DMF | 32 | $-[CH-CH_2-O-(CH_2)_2O]_x$ <br> $\quad\ \ \vert$ <br> $\quad\ CH_2N_3$ | −55 | 80,000 |

In Table 1, in all experiments using PECH as starting material, 10 g of PECH and 8 g of $NaN_3$ were used. For PECH, 10 g of PEEC and 5.5 g of $NaN_3$ were used. The hydroxyl functionality of all products was about 10.

Table 2 described the properties of several azido ether polymers and co-polymers made according to the invention with the catalyst. The effect of varying the weight ratio of catalysts to reactant rubber on molecular weight of resulting product is also illustrated. The effect of increasing the solvent/rubber ratio on molecular weight of the product is also noted.

TABLE 2

Properties of some Azido elastomers prepared with catalysts in DMA for 16h at 100° C.

| Reactant Rubber | Catalyst | Catalyst Rubber | Solvent Rubber | AZIDO PRODUCT Type | MW | Tg (°C.) | f |
|---|---|---|---|---|---|---|---|
| PECH | LiOCH₃ | 0.05 | 5 | GAP | 15,000 | −50 | 3.5 |
|  |  | 0.10 | 5 |  | 11,000 | −50 | 3.0 |
|  |  | 0.15 | 5 |  | 6,000 | −55 | 2.5 |
|  |  | 0.15 | 10 |  | 3,000 | −55 | 2.5 |
| PEEC | NaOH | 0.05 | 5 | GEC | 26,000 | −55 | 4.0 |
|  |  | 0.15 | 5 |  | 10,000 | −55 | 3.5 |
|  |  | 0.15 | 10 |  | 4,000 | −60 | 3.0 |

Turning again to the novel branched chain polymers according to our invention, when used as an energetic binder they exhibit certain superior physio-chemical properties relative to their linear counterparts.

Referring first to functionality, as indicted above, linear polymers as described in Frankel et al's U.S. Pat. No. 4,268,450, have an indicated functionality (f) of 2.

f is determined from the ratio (Mn/Me), wherein Mn and Me are respectively the number average MW and hydroxyl equivalent weight. When using the same relais reduced, the degradation process enables then the production of branched GAP and GEC with relatively high MW but with still a lower Tg compared to linear GAP. As shown in Table 2, branched GAP and GEC of MW of 6,000 and 10,000 respectively have a Tg of −55° C. compared to a Tg of −50° C. for linear GAP of MW 2000.

I claim:

1. A process for the preparation of branched chain hydroxy-terminated aliphatic azido ether polymers and copolymers, of structural formulas I and II,

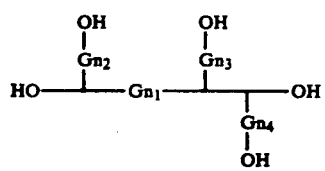

wherein
G = GAP unit

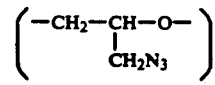

n = total number of GAP units;
n = n₁ + n₂ + n₃ + n₄ + ... + n₅ =

$$\sum_{i=1}^{s} n_i$$

$n_1$ = number of GAP units in segment 1;
$n_2$ = number of GAP units in segment 2;
$n_s$ = number of GAP units in segment s;
s = total number of segments in the molecule;
$400 \leq n \leq 2000$, of a functionality of about 10, and a molecular weight of 40,000 to 200,000; and

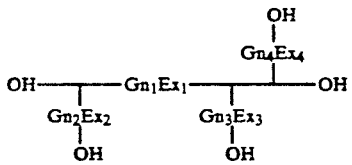

wherein E is a (—O—R) unit, where R is C1 to C4 lower-alkyl;
n = total number of GAP units in the copolymer;
x = total number of E units in the copolymer;
$n_1$ and $x_1$ are respectively the number of GAP and E units in segment 1;
$n_2$ and $x_2$ are respectively the number of GAP and E units in segment 2;
$n_s$ and $x_s$ are respectively the number of GAP and E units in segment s;
s = total number of segments in the copolymer;
$n = n_1 + n_2 + \ldots + n_s =$ $$\sum_{i=1}^{s} n_i$$

$x = x_1 + x_2 + \ldots + x_s =$ $$\sum_{i=1}^{s} x_i$$

$280 \leq x \leq 1400$
$280 \leq n \leq 1400$, of a functionality of about 10, and a molecular weight of 40,000 to 200,000
comprising the single step of respectively reacting a solid rubbery epichlorohydrin polymer (PECH) and epichlorohydrin-alkylene oxide (PEEC) copolymer, of a molecular weight of 0.50 to $5.0 \times 10^6$, with an alkali metal azide selected from the group consisting of sodium azide, potassium azide and lithium azide, in a suitable organic solvent, in the presence of a suitable initiator at a temperature of 70° to 100° C., while agitating for 16–32 h.

2. A process as claimed in claim 1, wherein the organic solvent is selected from the group consisting of dimethyl acetamide, dimethyl formamide and dimethyl sulfoxide.

3. A process as claimed in claim 2, wherein the organic solvent is dimethyl acetamide.

4. A process as claimed in claim 3, wherein the alkali metal azide is sodium azide.

5. A process as claimed in claim 4, wherein the rubber material is dissolved in dimethyl acetamide before reacting with sodium azide.

6. A process as claimed in claim 5, wherein the temperature is about 100° C.

7. A process as claimed in claim 6, wherein the reaction time is about 16 h.

8. A process as claimed in claim 7, wherein the initiator is selected from the group consisting of ethylene glycol, glycerol and water.

9. A process as claimed in claim 8, including the additional step of washing the polymer so formed with water and brine.

10. A process as claimed in claim 9, including the further additional step of purifying the polymer by dissolving the washed polymer in a suitable organic solvent, drying over magnesium sulfate and passing through a column containing silica gel and activated charcoal.

11. A process as claimed in claim 4, wherein the weight ratio of sodium azide to PECH is about 0.80.

12. A process as claimed in claim 4, wherein the weight ratio of sodium azide to PEEC is about 0.55.

13. A process as claimed in claim 1, wherein the alkylene oxide is ethylene oxide.

14. A process for the preparation of branched hydroxy terminated aliphatic azido polyethers of controlled molecular weight, having structural formulas I and II,

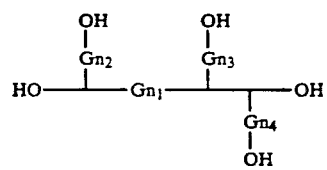

wherein
G = GAP unit

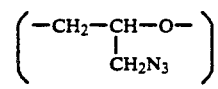

n = total number of GAP units;
$n = n_1 + n_2 + n_3 + n_4 + \ldots + n_s =$ $$\sum_{i=1}^{s} n_i$$

$n_1$ = number of GAP units in segment 1;
$n_2$ = number of GAP units in segment 2;
$n_s$ = number of GAP units in segment s;
s = total number of segments in the molecule;
$10 \leq n \leq 400$, of a functionality of about 2 to 10, and a molecular weight of 1,000 to 40,000; and

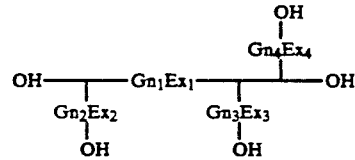

wherein E is a (—O—R) unit, where R is C1 to C4 lower-alkyl;
n = total number of GAP units in the copolymer;
x = total number of E units in the copolymer;
$n_1$ and $x_1$ are respectively the number of GAP and E units in segment 1;
$n_2$ and $x_2$ are respectively the number of GAP and E units in segment 2;
$n_s$ and $x_s$ are respectively the number of GAP and E units in segment s;
s = total number of segments in the copolymer;

$n = n_1$ and $n_2 + \ldots + n_s = \sum_{i=1}^{s} n_i$ $x = x_1$ and $x_2 + \ldots + x_s = \sum_{i=1}^{s} x_i$ $7 \leq n \leq 280$;

$7 \leq x \leq 280$, of a functionality of about 2 to 10, and a molecular weight of 1,000 to 40,000, comprising the single step of respectively reacting epichlorohydrin polymer (PECH) and epichlorohydrin-alkylene oxide copolymer (PEEC), of a molecular weight of 0.5 to $5.0 \times 10^6$, with an alkali metal azide selected from the group consisting of sodium azide, potassium azide and lithium azide, in a suitable organic solvent, in the presence of a suitable initiator and a basic degradation catalyst at a temperature of 70° to 100° C., while agitating for 16–32 h, and wherein the molecular weight of the polyether is controlled by adjusting the weight ratio of catalyst to PECH or PEEC.

15. A process as claimed in claim 14, wherein the organic solvent is selected from the group consisting of dimethyl acetamide, dimethyl formamide and dimethyl sulfoxide.

16. A process as claimed in claim 15, wherein the organic solvent is dimethyl acetamide.

17. A process as claimed in claim 16, wherein the alkali metal azide is sodium azide.

18. A process as claimed in claim 17, wherein the rubber material is dissolved in dimethyl acetamide before reacting with sodium azide.

19. A process as claimed in claim 18, wherein the elevated temperature is about 100° C.

20. A process as claimed in claim 19, wherein reaction time is about 16 h.

21. A process as claimed in claim 20, wherein the initiator is selected from the group consisting of ethylene glycol, glycerol and water.

22. A process as claimed in claim 21, wherein the weight ratio of catalyst to rubber material is 0.025 to 0.25.

23. A process as claimed in claim 22, wherein the weight ratio of solvent to PECH or PEEC is 5 to 10.

24. A process as claimed in claim 23, including the additional step of washing the polymer so formed with water and brine.

25. A process as claimed in claim 24, including the further additional step of purifying the polymer by dissolving the washed polymer in a suitable organic solvent, drying over magnesium sulfate and passing through a column containing silica gel and activated charcoal.

26. A process as claimed in claim 17, wherein the weight ratio of sodium azide to PECH is about 0.80.

27. A process as claimed in claim 17, wherein the weight ratio of sodium azide to PEEC is about 0.55.

28. A process as claimed in claim 23, wherein the catalyst is selected from the group consisting of lithium methoxide and sodium hydroxide.

29. A process as claimed in claim 28, wherein the rubber material is PECH.

30. A process as claimed in claim 28, wherein the rubber material is PEEC.

31. A process as claimed in claim 28, wherein the alkylene oxide is ethylene oxide.

32. A process as claimed in claim 29, wherein the weight of sodium azide is about 8 g and wherein the weight of PECH is about 10 g and the weight ratio of catalyst to PECH is between 0.05 and 0.15.

33. A process as claimed in claim 30, wherein the weight of sodium azide is about 5.5 g and wherein the weight of PEEC is about 10 g and the weight ratio of catalyst to PEEC is between 0.05 and 0.15.

34. Branched chain hydroxy-terminated aliphatic azido ether polymer of controlled molecular weight, of structural formulas I and II,

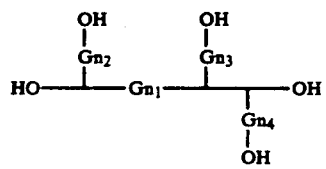

wherein
G = GAP unit

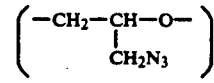

n = total number of GAP units;
$n = n_1 + n_2 + n_3 + n_4 + \ldots + n_s = \sum_{i=1}^{s} n_i$ $n_1$ = number of GAP units in segment 1;
$n_2$ = number of GAP units in segment 2;
$n_s$ = number of GAP units in segment s;
s = total number of segments in the molecule;
$10 \leq n \leq 400$, of a functionality of about 2 to 10, and a molecular weight of 1,000 to 40,000; and

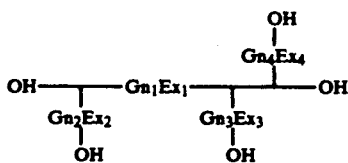

wherein E is a (—O—R) unit, where R is C1 to C4 lower-alkyl;
n = total number of GAP units in the copolymer;
x = total number of E units in the copolymer;
$n_1$ and $x_1$ are respectively the number of GAP and E units in segment 1;
$n_2$ and $x_2$ are respectively the number of GAP and E units in segment 2;
$n_s$ and $x_s$ are respectively the number of GAP and E units in segment s;
s = total number of segments in the copolymer;
$n = n_1 + n_2 + \ldots + n_s =$ $$x = x_1 + x_2 + \ldots + x_s = \sum_{i=1}^{s} n_i$$

$$\sum_{i=1}^{s} x_i$$

$7 \leq n \leq 280$;

$7 \leq x \leq 280$, of a functionality of about 2 to 10, and a molecular weight of 1,000 to 40,000, when prepared by a process as claimed in claim 14.

35. Branched hydroxy-terminated azido ether polymers with molecular weights of between 3,000 and 15,000, a glass transition temperature between −50° C. and −55° C. and a functionality of 2.5–3.5, when prepared by a process as claimed in claim 32.

36. Branched hydroxy-terminated azido ether copolymers with molecular weights between 4,000 and 26,000, a glass transition temperature between −55° C. and −60° C. and a functionality of 3.0–4.0, when prepared by a process as claimed in claim 33.

37. Branched chain hydroxy-terminated aliphatic azido ether polymers and copolymers of structural formulas I and II as defined in claim 1, having molecular weights between 40,000 and 200,000, a hydroxyl functionality of about 10 and a glass transition temperature of about −45° C. to −55° C., when prepared by a process as claimed in claim 1.

* * * * *